United States Patent [19]

van der Lely et al.

[11] 4,095,535
[45] Jun. 20, 1978

[54] ROTARY HARROWS

[75] Inventors: Ary van der Lely, Maasland; Cornelis Johannes Gerardus Bom, Rozenburg, both of Netherlands

[73] Assignee: C. van der Lely N.V., Maasland, Netherlands

[21] Appl. No.: 768,433

[22] Filed: Feb. 14, 1977

Related U.S. Application Data

[62] Division of Ser. No. 590,520, Jun. 26, 1975, Pat. No. 4,018,170.

[30] Foreign Application Priority Data

Jun. 28, 1974 Netherlands .......................... 7408749

[51] Int. Cl.² .............................................. A01C 23/02
[52] U.S. Cl. ............................................ 111/6; 172/59
[58] Field of Search ........................................ 111/6-7; 172/59, 110, 112

[56] References Cited

U.S. PATENT DOCUMENTS

| 1,725,190 | 8/1929 | Hicks | 111/7 |
| 3,111,917 | 11/1963 | Dawrs | 111/6 |

FOREIGN PATENT DOCUMENTS

1,038,235  8/1966  United Kingdom ..................... 111/7

Primary Examiner—Robert E. Bagwill
Attorney, Agent, or Firm—Mason, Mason & Albright

[57] ABSTRACT

A soil cultivating implement or rotary harrow has a row of soil-working members rotatably mounted on upwardly extending shafts. Driving means rotates the shafts and tools, preferably tines, are moved through the soil to work same. Fluid material from a container on a supporting structure is passed in the worked soil through injectors located adjacent the soil-working member. The injectors can be included with each soil-working member and can comprise one or more tine injectors. The injectors extend into the ground and conduct fluid through ducts and passages from the container into the ground. A roller at the rear of the injectors smooths the worked soil.

10 Claims, 6 Drawing Figures

ROTARY HARROWS

This is a div. of Ser. No. 590,520 filed 6/26/75 (now U.S. Pat. No. 4,018,170).

For a better understanding of the invention, and to show how the same may be carried into effect, reference will now be made, by way of example, to the accompanying drawings, in which.

Figures 1, 3:
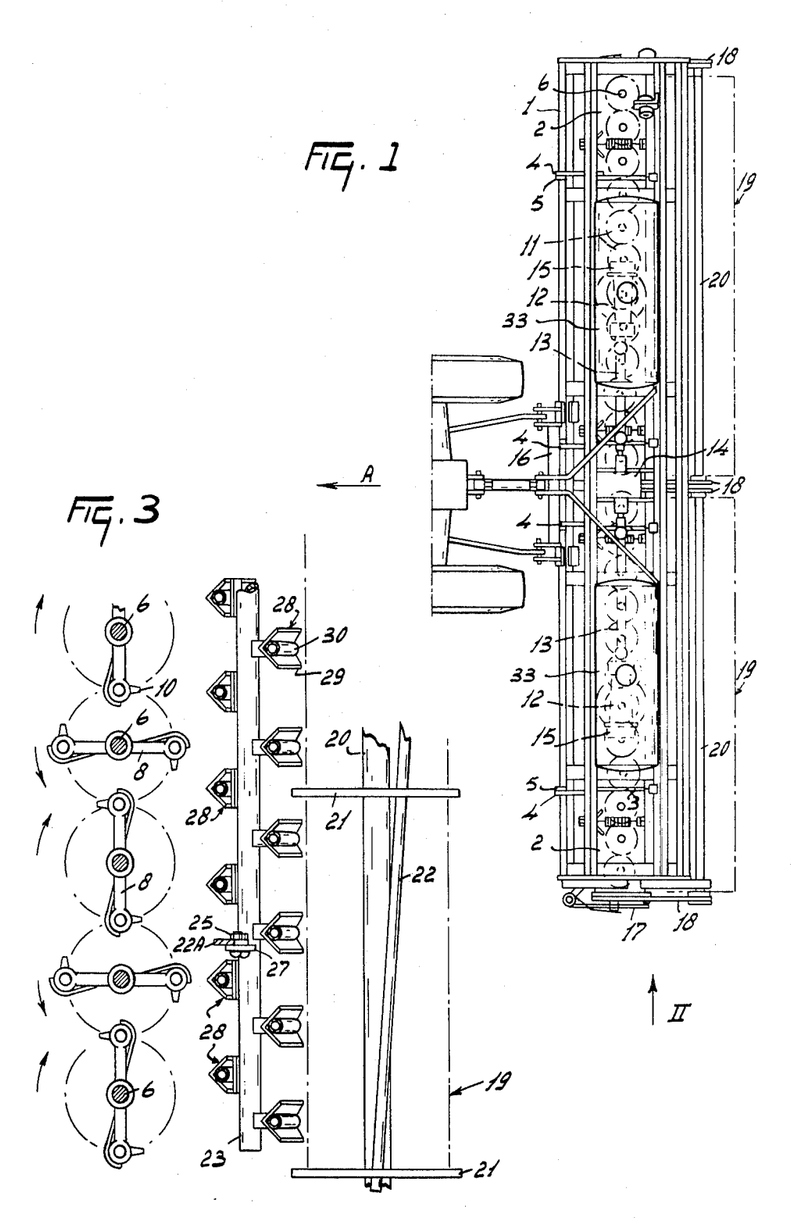
FIG. 1 is a somewhat diagrammatic plan view of a soil cultivating implement or rotary harrow in accordance with the invention connected to the rear of an agricultural tractor.
FIG. 3 is a part-sectional plan view, the section being taken on the line III—III in FIG. 2.
Figure 2:
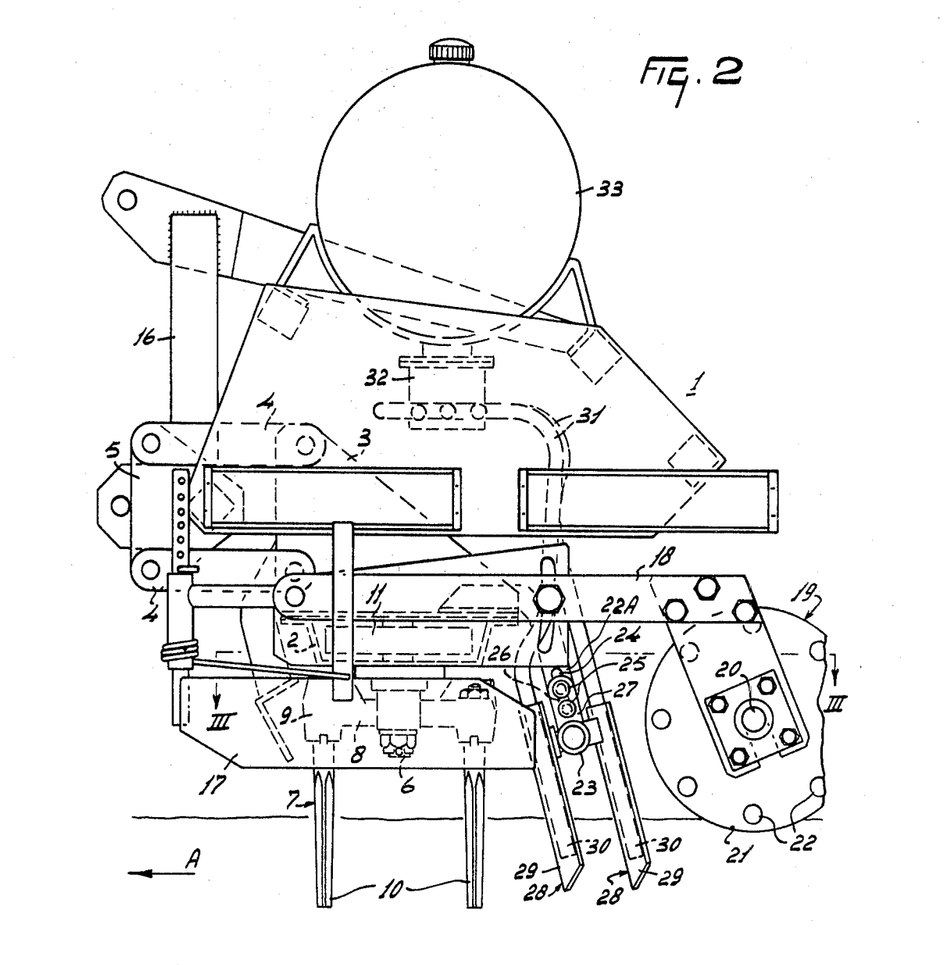
FIG. 2 is a side elevation, to an enlarged scale, of the implement or tractor of FIG. 1 as seen in the direction indicated by an arrow II in FIG. 1.

Referring to FIGS. 1 to 3 of the accompanying drawings, the soil cultivating implement or rotary harrow which is illustrated therein will be referred to, throughout the remaining descriptive portion of this specification merely as "a rotary harrow" for the sake of brevity. The rotary harrow has a supporting structure 1 which comprises a plurality of frame beams that extend substantially horizontally transverse, and normally substantially horizontally perpendicular, to the intended direction of operative travel of the harrow which is indicated by an arrow A in FIGS. 1 and 2 of the drawings. The frame beams are rigidly interconnected by a number of supports that all extend substantially parallel to the direction A. Two hollow box-shaped frame portions 2 are provided beneath the supporting structure 1 so as to extend in substantially longitudinal alignment with one another in a direction perpendicular to the direction A with their neighbouring ends in very close substantially adjoining relationship. Each frame portion 2 carries a corresponding group of rotary soil working members. The top of each frame portion 2 is provided, at two locations which are spaced from its opposite ends, with corresponding upright supports 3 which, as can be seen in FIG. 2 of the drawings, are of substantially although hot exactly triangular shape. The lowermost edge of each support 3 extends throughout the width (in the direction A) of the corresponding frame portion 2 whilst its leading edge with respect to the direction A is substantially vertically disposed. The supports 3 thus taper in an upward direction and it will be noted from FIG. 1 of the drawings that the two supports 3 which are nearest to the substantially adjoining ends of the two frame portions 2 are closer to those substantially adjoining ends than are the other two supports 3 which are nearer to the other two ends of the two frame portions 2 that are relatively remote from one another. Horizontal pivots connect the ends of two arms 4 to each support 3 at the front thereof with respect to the direction A and near the top and bottom of that support. The arms 4 extend more or less horizontally forwards from the corresponding supports 3 and their leading ends are turnably connected by further substantially horizontal pivots to upright brackets 5 which are rigidly secured to one of the beams of the supporting structure 1. As will be evident from FIG. 2 of the drawings, each frame portion 2 is thus connected to the frame structure 1 by a corresponding dual parallelogram linkage which allows that frame portion 2 to move upwardly and downwardly relative to the suppoting structure 1 during the use of the harrow independently of the other frame portion 2. Chains which are not illustrated in the accompanying drawings are provided to limit the downward displacement of each frame portion 2 that can take place relative to the supporting structure 1 during operation of the rotary harrow and during inoperative transport of the latter.

Each frame support 2 rotatably supports, by means of corresponding upper and lower bearings, a row of 12 upwardly extending and normally substantially vertically disposed shafts 6, the axes of rotation of said shafts 6 being regularly spaced apart from one another at intervals which preferably have magnitudes of substantially 25 centimeters. Each shaft 6 embodies the axis of rotation of a corresponding soil working member 7 that is secured to a portion of that shaft 6 which projects from beneath the bottom of its frame portion 2. Each soil working member 7 comprises a substantially horizontal tine support 8 which is secured centrally to the corresponding shaft 6 and two substantially vertically disposed and substantially cylindrical tine holders 9 that are integrally or otherwise fixedly mounted at the opposite ends of the support 8. The two holders 9 of each soil working member 7 receive the upper fastening portions of corresponding downwardly extending soil working tines 10. A lower portion of each tine 10 is an active or soil working portion which is arranged to penetrate into the soil in substantially the manner shown in FIG. 2 of the drawings during operation of the harrow and which occupies a downwardly and rearwardly inclined "trailing" disposition with respect to its overlying fastening portion and with respect to the intended direction of rotation of the soil working member 7 concerned (see the arrows in FIG. 3 of the drawings). The tines 10 of each member 7 are a little further apart from one another than are the axes of rotation embodied in immediately neighbouring shafts 6 so that the paths described by the lowermost free ends or tips of the active or soil working portions of those tines 10 overlap one another to produce a single broad strip of worked soil in respect of each frame portion 2 during the use of the harrow. Each shaft 6 is provided, inside the corresponding hollow frame portion 2, with a toothed pinion 11 which has straight or spur teeth. The teeth of the 12 pinions 11 that correspond to each of the two groups of soil working members 7 are in intermeshing relationship in the manner which can be seen in outline in FIG. 1 of the drawings. One shaft 6 of the central pair of the row of twelve shafts 6 that corresponds to each frame portion 2 has an upward extension into a corresponding gear box 12 that is mounted on top of the frame portion 2 concerned. Each shaft extension is provided, inside the corresponding gear box 12, with a bevel pinion whose teeth are in driven mesh with those of a further bevel pinion carried by a substantially horizontal shaft that extends parallel to the length of the frame portion 2 concerned and thus substantially perpendicular to the direction A. One splined end of each substantially horizontal shaft extends into a corresponding change-speed gear 15 together with the splined end of an overlying parallel shaft. Different transmission ratios between the two shafts whose ends project into the corresponding change-speed gears 15 can be obtained by exchangeably and/or interchangeably mounting on those ends co-operating pairs of straight- or spur-toothed pinions of different sizes. Each change-speed gear 15 comprises a releasably mounted cover which encloses the chosen pair of toothed pinions and maintains them free from contamination by dirt during the operation of the harrow.

Each of the upper substantially horizontal shafts that have ends entered in the change-speed gears 15 has its opposite end connected by way of an overload release clutch and a universal joint with one end of a corresponding shaft 13. The opposite and closer ends of the two shafts 13 are connected by further universal joints to the ends of two output shafts of a central gear box 14 that projects substantially horizontally from opposite sides of that gear box in directions that are substantially perpendicular to the direction A. The central gear box 14 is secured to the supporting structure 1 and has a rotary input shaft whose splined or otherwise keyed end projects forwardly from the front of that gear box in substantially the direction A. The rotary input shaft is provided, inside the gear box 14, with at least one bevel pinion whose teeth are in mesh with further bevel pinions carried by the two output shafts of the gear box. A coupling member or trestle 16 of generally triangular configuration is rigidly secured to the supporting structure 1 at the front of that structure with respect to the direction A and enables said structure to be connected to the three-point lifting device or hitch at the rear of an agricultural tractor or other operating vehicle in the generally known manner which is illustrated in outline in FIG. 1 of the drawings.

The relatively remote ends of the two frame portions 2 are provided with corresponding substantially vertical shield plates 17 that both normally extend substantially parallel to the direction A. Each shield plate 17 is turnable about the axis of a corresponding upright pivot relative to the frame portion 2 concerned to enable it to yield outwardly, against the action of a coil spring that is wound around the corresponding pivot, in the event of a stone or the like becoming momentarily trapped between the shield plate 17 and the neighboring soil working member 7. The shield plates 17 minimize ridging at the boundaries of the broad strip of land that is worked by the harrow and substantially prevent stones and other sharp objects from being flung laterally of the path of travel of the harrow by its rapidly moving tines 10 when the harrow is in operation. Each end of each of the two frame portions 2 comprises a corresponding substantially vertical plate alongside which a corresponding arm 18 is turnable upwardly and downwardly about a substantially horizontal axis that is afforded by a strong pivot mounted at the top of the end plate concerned and at the front thereof with respect to the direction A. As will be evident from FIG. 2 of the drawings, the end plates are formed with arcuately curved slots whose centers of curvature coincide with the positions of the corresponding pivots and the arms 18 are formed with single holes that are in register with the corresponding slots. Bolts are entered through the single holes and through the registering slots and can be tightened to retain the arms 18 in any chosen angular settings about the axes defined by the pivotal mountings of those arms relative to the frame portions 2. The rearmost ends of the arms 18 with respect to the direction A carry downwardly directed brackets and two rotatable supporting members that are in the form of open ground rollers 19 are rotatably mounted in bearings carried by the two arm brackets that correspond to each frame portion 2. Each ground roller 19 comprises a central axially mounted tubular support 20 which carries, at regular intervals along its length, a plurality of substantially vertical plates 21 (FIGS. 2 and 3), a plurality, such as eight, of tubular or rod-formation elongate elements 22 being entered through peripheral holes in the plates 21 in such a way that each element 22 is wound helically around the axis of the corresponding tubular support 20 to some extent (see FIG. 3). It will be apparent that the angular settings of the arms 18 which are chosen relative to the end plates of the frame portions 2 dictate the levels of the axes of rotation of the two rollers 19 with respect to those frame portions and thus the depths to which the tines 10 of the soil working members 7 can penetrate into the ground.

The rear of each frame portion 2 with respect to the direction A carries supporting brackets 22A to which tubular supports 23 are connected so as to extend parallel to the corresponding frame portions 2. Each supporting bracket 22A includes a downwardly directed portion formed with a longitudinally extending slot 24. The slots 24 receive the shanks of pairs of fastening bolts 25 that are also entered through slots 26 formed in lugs 27 carried by the corresponding tubular supports 23. The fastening bolts 25 co-operate with the slots 24 and 26 in such a way that the supports 23 can be raised and lowered relative to the brackets 22A and be retained at chosen levels with respect to those brackets by tightening the bolts 25 after appropriate adjustment. Each support 23 carries a plurality of means for introducing fluid materials into the soil in the form of injectors 28 that are located alternately in front, and to the rear, of the support 23 concerned with respect to the direction A, the distance between immediately neighboring injectors 28 in a direction parallel to the tubular support 23 which carries them preferably being substantially 10 centimeters. The rows of injectors 28 extend throughout the whole of the width of the strip of ground which will be worked by the rotary harrow during the operation thereof. With the arrangement which has been described, and that is illustrated in the accompanying drawings, each support 23 will carry a front row of the injectors 28 and a rear row thereof and it is preferred that the distance between the two rows, measured in the direction A, should also be substantially 10 centimeters. It can be seen from FIG. 3 of the drawings that the injectors 28 are located substantially midway between the soil working members 7 and the ground rollers 19 with respect to the direction A.

Each injector 28 comprises a support bar 29 of L-shaped cross-section whose limbs diverge rearwardly from the leading junction between them with respect to the direction A. The support bars 29 are inclined rearwardly from top to bottom with respect to the direction A and the lowermost ends of the two limbs of each of them are bevelled to form a lowermost tip. A tube 30 extends downwardly between the rearwardly divergent limbs of each support bar 29 and opens at a level a short distance above that of the corresponding tip (see FIG. 2). The uppermost ends of the tubes 30 that correspond to the injectors 28 for each group of soil working members 7 are connected by ducts 31 to a corresponding fluid distributor 32 that is mounted beneath a corresponding fluid container or tank 33. There are thus two of the tanks 33 that are mounted on brackets carried by the supporting structure 1 at locations approximately midway across the widths of the corresponding underlying frame portions 2. The ducts 31 are, of course, of flexible construction to accommodate movements of the frame portions 2 relative to the supporting structure 1. Each tank 33 is of substantially right circular cylindrical configuration having somewhat domed opposite ends, and its longitudinal axis is arranged substantially parallel to that of the underlying frame portion 2 and thus substantially perpendicular to the direction A (see FIG. 1). Thus, each group of soil working members 7 is associated with a corresponding fluid container or tank of a fluid material for stimulating the growth of plants such, purely for example, as ammonia which can be introduced into the soil in a manner that is known per se, during the use of the harrow, by way of the fluid distributors 32, the ducts 31 and the injectors 28.

In the use of the rotary harrow that has been described with reference to FIGS. 1 to 3 of the drawings, its coupling member or trestle 16 is connected to the three-point lifting device or hitch at the rear of an operating tractor or other vehicle and the rotary input shaft of the central gear box 14 is placed in driven connection with the power take-off shaft of the same tractor or other vehicle by way of an intermediate telescopic transmission shaft, that is of a construction which is known per se, having universal joints at its opposite ends. The levels of the axes of rotation of the two rollers 19 will previously have been set relative to those of the corresponding frame portions 2, having regard to the nature of the soil that is to be worked and to the operating conditions, thus dictating the depths to which the tines 10 can penetrate into the soil. It will be remembered that the two groups of soil working members 7 that corresponds to the two frame portions 2 are movable upwardly and downwardly, independently of each other, with respect to the supporting structure 1 during operation of the harrow, Also, the two change-speed gears 15 will have been pre-set to give appropriate transmission ratios between the two shafts which each of them comprise so that the soil working members 7 will rotate at a faster or slower speed without having to alter the input speed of rotation applied to the central gear box 14 by the power take-off shaft of the operating tractor or other vehicle. As the harrow moves over the ground that is to be cultivated, neighbouring soil working members 7 rotate in the opposite directions that are indicated by arrows in FIG. 3 of the drawings and a plant growth stimulating material, such as a fluid fertiliser which could, for example, be ammonia, is concurrently inserted into the soil by the injectors 28. The injection of material takes places in the immediate proximity of the rotary soil working tines 10 and in a region between those tines and the immediately following rollers 19 which consolidate and flatten the worked soil to some extent, simultaneously breaking up any uncrushed lumps of soil displaced by the tines 10. Thus, the fluid plant growth stimulating material is injected into the soil where that soil is in a well broken condition so that material can become uniformly dispersed therein. The well broken soil is compacted to some extent substantially instantaneously after the injection of the material so that the escape of that material from the soil is avoided, or at least reduced, particularly when the fluid material is a vaporizing liquid which has a considerable tendency to revert to a gaseous condition at atmospheric pressure. Soil fertilisation by fluid materials can be carried out very effectively in this manner with a substantially uniform distribution of the material through the soil that has been treated. The fore and aft off-set arrangement of neighbouring injectors 28 (see FIG. 3 of the drawings) is a factor which conducive to the uniform distribution of a fluid material through the treated soil.

Figure 4:
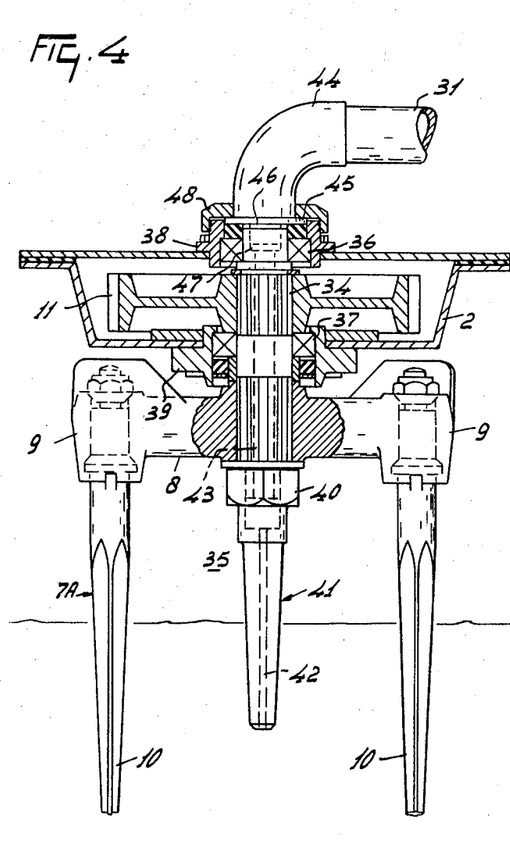
FIG. 4 is a sectional elevation illustrating an alternative construction in which soil-working members of the implement or harrow are provided with means for introducting fluid materials into the soil.

FIG. 4 of the drawings illustrates an alternative embodiment in which soil working members 35 are themselves provided with means for introducing fluid materials into the soil. To this end, each soil working member 35 has a corresponding upright and normally vertical or substantially vertical shaft 34 that embodies its axis of rotation, that shaft being axially hollow. Each shaft 34 is rotatably received in substantially vertical ball bearings 36 and 37 carried by the upper and lower walls of the corresponding frame portion 2, respectively. A cup nut 40 or like connecting nut couples the lowermost end of the hollow shaft 34 that is illustrated in FIG. 4, and that projects from beneath the center of the corresponding tine support 8, to the upper end of an injector 41. The injector 41 is of circular cross-section and tapers downwardly, a central channel 42 being formed therethrough which opens at the lowermost free end or tip of the injector 41 at a level that is somewhat higher than that of the free ends or tips of the active or soil working portions 7A of the corresponding tines 10 but at a level which will normally be well below the ground surface, during operation, as illustrated in FIG. 4. In fact, the level of the lowermost free end or tip of the illustrated injector 41 is substantially three-quarters of the way down between the levels of the top and bottom ends of the corresponding tines 10. The free end or tip of the injector 41 is substantially coincident with the axis of rotation of the soil working member 35.

The hollow interior of the rotary shaft 34 defines an axial channel 43 that is in rectilinear connection with the upper end of the injector channel 42 in the region of the cup nut 40 or other connecting nut. The uppermost end of the shaft 34 is coupled to one end of a right angled connecting member 44 whose opposite end is linked to one of the flexible ducts 31. The end of the connecting member 44 that is remote from the duct 31 has a flange 45 which is located just inside the uppermost end of a housing 38 of the corresponding upper ball bearing 36. The uppermost end of the axial channel 43 through the rotary shaft 34 is formed with a larger diameter recess 47 and an axially bored stud 46 that is rigid with the connecting member flange 45 is entered in the recess 47. The flange 45 is maintained in place by a large cup nut 48 that co-operates with a screwthread on the upper external surface of the bearing housing 38 so as to close the top of that housing. The connecting member 44 does not rotate with the shaft 34 during operation and it will be seen from FIG. 4 of the drawings that a fluid seal, which is shown only diagrammatically in that Figure, is provided between the flange 45 and the ball bearing 36 around the upper end of the portion of the shaft 34 that is formed with the internal recess 47. In the embodiment of FIG. 4 of the drawings, the plant growth stimulating fluid material is again injected into the soil in the immediate proximity of the active or soil working portion 7A of the tines 10 of each soil working member 35 and, in fact at a location which substantially corresponds with the axis of rotation of each soil working member 35. This tends to provide an even better uniform distribution of the fluid material throughout the treated soil than does the embodiment described with reference to FIGS. 1 to 3 of the drawings.

Figure 5:
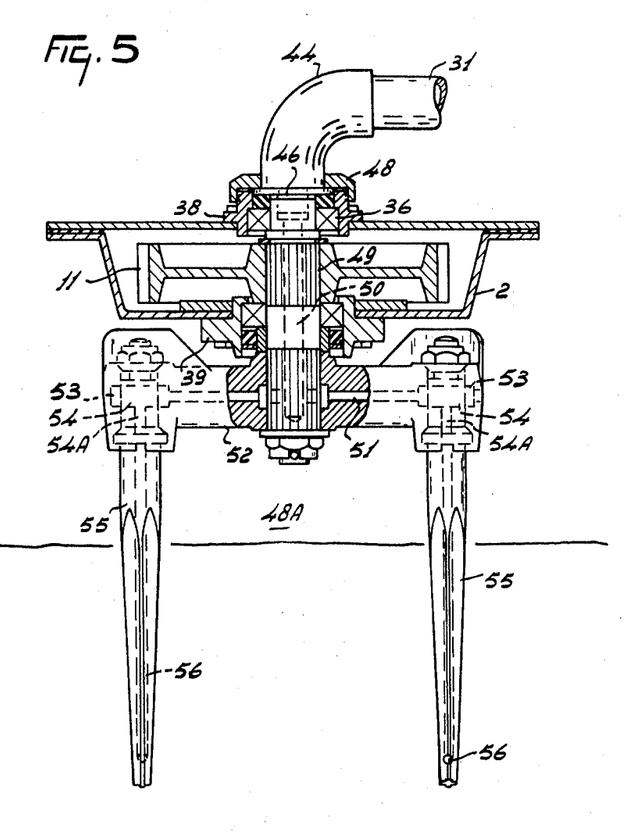
FIG. 5 is a similar sectional elevation to FIG. 4 but illustrates the construction of a further alternative soil working member provided with means for introducing fluid materials into the soil.
Figure 6:
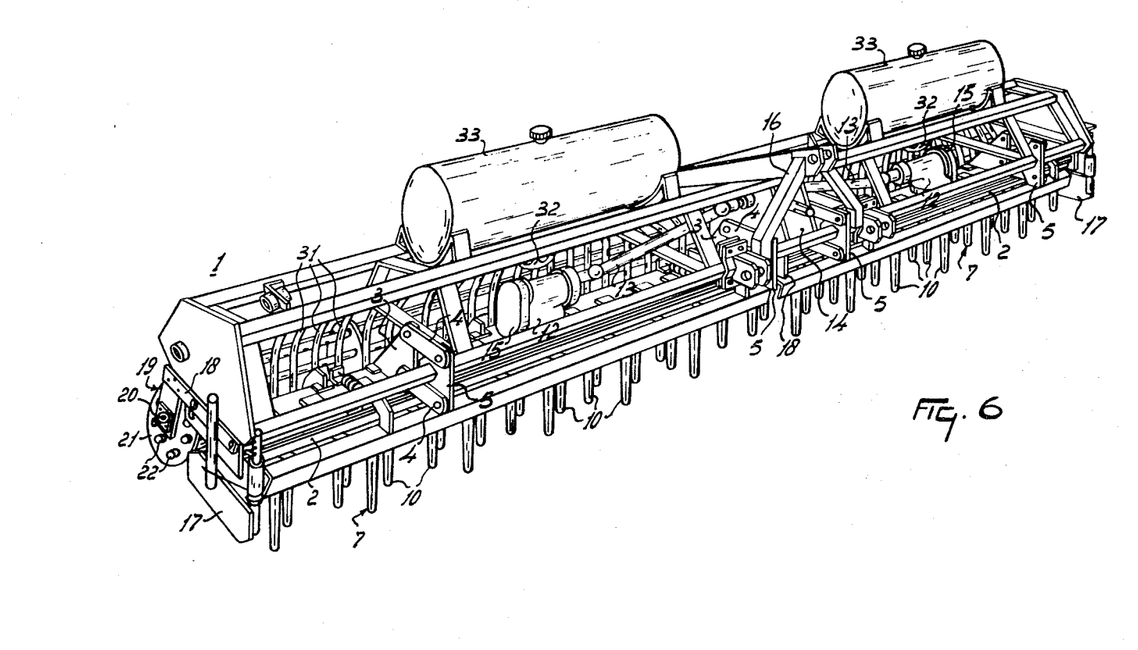

FIG. 5 of the drawings illustrates a further alternative construction in which a single soil working member 48A can be seen. The soil working member 48A is secured to a central upwardly extending, and normally vertical or substantially vertical, shaft 49 which embodies its axis of rotation and which is formed with a central axial channel 50 whose lowermost end is closed. However, the channel 50 communicates, near its lowermost closed end, with two diametrically opposed branches of a channel 51 that extends substantially axially through the two limbs of a tine support 52 that is otherwise similar to one of the previously described tine supports 8. The ends of the branches of the channel 51 that are remote from the center of the tine support 52 open into chambers 53 that are formed in substantially cylindrical tine holders which are otherwise substantially identical to the previously described tine holders 9. The tine holders receive fastening portions at the uppermost ends of two tines 55 and those fastening portions are formed with radial bores 54 that communicate with the chambers 53. The radial bores 54 open into axial bores 54A through the fastening portions and those bores, in turn, communicate with channels 56 which extend lengthwise through the active or soil working portions of the tines 55 to open at locations just above the free ends or tips of the latter and at the rear sides thereof with respect to the intended directions of rotation of the corresponding soil working members 48A. In the embodiment of FIG. 5 of the drawings, the fluid material is injected into the soil at a greater depth, relative to the working depth, than it is in either of the two preceding embodiments. The fluid material is, in fact, freed from the channels 56 at a level immediately above that of the lowermost free ends or tips of the trailing active or soil working portions of the two tines 55 of each soil working member 48A. The material thus escapes into the soil very close to the level of rupture or breakage of the worked soil from the underlying undisplaced sub-soil. As, in the use of all of the embodiments, the fluid material is injected into the soil in the immediate proximity of the tines which break up that soil, the well broken up structure of the soil in that region greatly facilitates the uniform distribution of the fluid material through the soil, the helically wound substantially longitudinally extending elements of the almost immediately following rollers 19 compacting the soil so soon after the introduction of the material that its escape from the soil is substantially completely prevented or is reduced to a very favourable extent as compared with the amount of escape which would otherwise take place. While it is preferred to use the tines for the displacement and consequent cultivation of the soil into which fluid materials are to be introduced, it is noted that the employment of the tines is not essential and that alternative soil working tools can also be made use of. Although not mentioned it will be clear that the plant growth stimulating material also might consist of fertilizers or chemicals for killing weeds and/or insects.

Although various features of the rotary harrows that have been described and/or that are illustrated in the accompanying drawings will be set forth in the following claims as inventive feature, it is emphasized that the invention is not necessarily limited to those features and that it includes within its scope each of the parts of each rotary harrow construction that has been described and/or that is illustrated in the accompanying drawings both individually and in various combinations.

What is claimed is:

1. A soil cultivating implement or rotary harrow comprising a frame and a plurality of rotatable soil working members arranged in a transverse row, said members being supported and positioned on a portion of said frame to work overlapping strips of soil during operation, driving means engaging said soil working members and rotating same about corresponding upwardly extending shafts that define the axes of rotation of the soil working members, each soil working member comprising a substantially horizontal support and at least one downwardly extending tine depending from said support adjacent a lateral end thereof, said support mounting injector means that introduces fluid material into the soil being worked by said tine, said injector means comprising an elongated ejector that extends downwardly substantially parallel to said tine and said ejector being detachably connected to said support with fastening means located below the support, said ejector member having an internal conduit that communicates with a bore in the corresponding shaft and said bore extending throughout the length of said shaft.

2. A harrow as claimed in claim 1, wherein said injector is fastened to a central lower portion of said support by a releaseable nut that engages the lower end of said shaft.

3. A harrow as claimed in claim 1, wherein a tine depends from each lateral end of the support, said ejector being substantially circular in cross section and tapering towards a lowermost tip.

4. A harrow as claimed in claim 3, wherein said conduit has a longitudinal center axis that coincides with the axis of rotation of the soil working member.

5. A harrow as claimed in claim 1, wherein said injector has a length which is at least half the length of said one tine.

6. A soil cultivating implement or rotary harrow comprising a frame and a plurality of rotatable soil working members, positioned in a row that extends transverse to the direction of travel, said members being supported on a portion of said frame to work overlapping strips of soil during operation, driving means engaging said soil working members and rotating same about corresponding upwardly extending shafts that define the axes of rotation of said members, at least one soil working member comprising a substantially horizontal support and downwardly extending tine means spaced from the axis of rotation of said soil working member, downwardly extending conduit means mounted on said member that injects fluid material into the soil adjacent the lower end of said tine means, said conduit means extending substantially parallel to said tine means and being detachably connected to said support, said conduit means communicating with a fluid bore in a respective shaft, the longitudinal axis of said conduit means being substantially parallel to the axis of rotation of the corresponding soil working member.

7. A harrow as claimed in claim 6, wherein said conduit means is located internally of said tine means and said support has laterally extending channel means that communicates fluid from said bore to the conduit means.

8. A harrow as claimed in claim 7, wherein the opposite ends of said support are each connected to a tine and each tine is an injector with a respective conduit in communication with said channel means.

9. A harrow as claimed in claim 8, wherein a lower active portion of each tine is in trailing relationship with the normal direction of rotation of its corresponding soil-working member, said active portion having an outlet for fluid materials in a rear side thereof with respect to said direction of rotation.

10. A harrow as claimed in claim 8, wherein an upper end of said shaft has a connecting member which establishes communication with a duct leading to a fluid container carried by said harrow, said connecting member and said shaft being journalled to one another and being relatively freely rotatable with respect to one another.

* * * * *